United States Patent
Madsen et al.

(10) Patent No.: US 9,611,833 B2
(45) Date of Patent: Apr. 4, 2017

(54) WIND TURBINE BLADE WITH NARROW SHOULDER AND RELATIVELY THICK AIRFOIL PROFILES

(75) Inventors: Jesper Madsen, Gesten (DK); Christian Frank Andersen, Kolding (DK); Peter Fuglsang, Vejle (DK)

(73) Assignee: LM GLASFIBER A/S, Kolding (DK)

( * ) Notice: Subject to any disclaimer, the term of this patent is extended or adjusted under 35 U.S.C. 154(b) by 1118 days.

(21) Appl. No.: 13/810,049

(22) PCT Filed: Jul. 16, 2010

(86) PCT No.: PCT/EP2010/060342
§ 371 (c)(1),
(2), (4) Date: Jan. 14, 2013

(87) PCT Pub. No.: WO2012/007058
PCT Pub. Date: Jan. 19, 2012

(65) Prior Publication Data
US 2013/0115098 A1     May 9, 2013

(51) Int. Cl.
*F03D 1/06*     (2006.01)

(52) U.S. Cl.
CPC ......... *F03D 1/0633* (2013.01); *F03D 1/0641* (2013.01); *F05B 2240/301* (2013.01); *F05B 2250/62* (2013.01); *F05B 2250/71* (2013.01); *Y02E 10/721* (2013.01)

(58) Field of Classification Search
CPC . F03D 1/0633; F03D 1/0641; F05D 2240/301
See application file for complete search history.

(56) References Cited

U.S. PATENT DOCUMENTS

| | | | | |
|---|---|---|---|---|
| 4,976,587 A * | 12/1990 | Johnston | ............... | B64C 27/473 |
| | | | | 416/226 |
| 5,474,425 A | 12/1995 | Lawlor | | |
| 6,503,058 B1 * | 1/2003 | Selig | ..................... | F03D 1/0641 |
| | | | | 416/223 R |
| 7,344,360 B2 * | 3/2008 | Wetzel | .................. | F03D 1/0633 |
| | | | | 416/238 |

(Continued)

FOREIGN PATENT DOCUMENTS

EP     1152148 A1     11/2001

OTHER PUBLICATIONS

General Electric Company, "Mod-5A Wind Turbine Generator Program Design Report," vol. III—Final Design and System Description, Book 1, DOE/NASA/0153-3 (Aug. 1984), available at, http://ntrs.nasa.gov/archive/nasa/casi.ntrs.nasa.gov/19860006254_1986006254.pdf.

*Primary Examiner* — Woody Lee, Jr.
(74) *Attorney, Agent, or Firm* — Nath, Goldberg & Meyer; Jerald L. Meyer; Tanya E. Harkins (57) ABSTRACT

A blade (10) for a rotor of a wind turbine having a profiled contour divided into: a root region (30), an airfoil region (34), and a transition region (32) between the root region (30) and the airfoil region (34). A shoulder (40) is located at the boundary between the transition region (32) and the airfoil region (34). The blade's profiled contour comprises a local relative thickness defined as the local ratio between a maximum profile thickness (t) and the chord length (c). The ratio between the shoulder width (W) and the blade length (L) being less than or equal to 0.075, and the relative thickness (t/c) in a blade length interval of 0-0.8 L is at least 22%.

47 Claims, 4 Drawing Sheets

(56) References Cited

U.S. PATENT DOCUMENTS

| | | | | |
|---|---|---|---|---|
| 7,946,803 B2 * | 5/2011 | Wobben | ................ | F03D 1/0641 |
| | | | | 415/4.3 |
| 8,241,000 B2 * | 8/2012 | Blanton | ................ | F03D 1/0641 |
| | | | | 416/223 R |
| 8,801,387 B2 * | 8/2014 | Fukami | ................ | F03D 1/0633 |
| | | | | 416/223 R |
| 8,814,525 B2 * | 8/2014 | Petsche | ................ | F03D 1/0641 |
| | | | | 416/223 R |
| 9,057,359 B2 * | 6/2015 | Fuglsang | .............. | F03D 1/0641 |
| 2008/0317600 A1 | 12/2008 | Enevoldsen | | |

* cited by examiner

WIND TURBINE BLADE WITH NARROW SHOULDER AND RELATIVELY THICK AIRFOIL PROFILES

This is a National Phase Application filed under 35 U.S.C. 371 as a national stage of PCT/EP2010/060342, filed Jul. 16, 2010, the content of each of which is hereby incorporated by reference in its entirety.

The present invention relates to a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising: a profiled contour including a pressure side and a suction side, as well as a leading edge and a trailing edge with a chord having a chord length extending there between, the profiled contour, when being impacted by an incident airflow, generating a lift, wherein the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region, and with a shoulder having a shoulder width and located at the boundary between the transition region and the airfoil region, wherein the blade has a blade length, and the profiled contour comprises a local relative thickness defined as the local ratio between a maximum profile thickness and the chord length.

Wind turbine manufacturers are constantly making efforts to improve the efficiency of their wind turbines in order to maximise the annual energy production. Further, the wind turbine manufacturers are interested in prolonging the lifetime of their wind turbine models, since it takes a long time and a lot of resources to develop a new wind turbine model. An obvious way to improve the efficiency of the wind turbine, is to improve the efficiency of the wind turbine blades, so that the wind turbine can generate a higher power output at a given wind speed. However, one cannot arbitrarily replace the blades of a wind turbine model with other, more efficient blades. The wind turbine models are dimensioned to specific loading ranges from the rotor and the blades. Thus, it must be ensured that the new wind turbine blades comply with the design specifications of the wind turbine model, and further it must be ensured that the wind turbine blade itself complies with warranty issues and built to last for at least a number of years without breaking down.

It is an object of the invention to obtain a new wind turbine blade, which is designed to comply with the previous design specification or which provides a useful alternative to existing blades.

According to a first aspect of the invention, the object is obtained by a wind turbine blade of the aforementioned kind, wherein the ratio between the shoulder width and the blade length is less than or equal to 0.075, and the relative thickness in a blade length interval of 0-0.8 L is at least 22%.

Thus, it is seen that the invention provides a slender and relative thick wind turbine blade. Thereby, it is possible to minimise loading of the blade, since the total area of the blade is minimised, thus lowering for instance storm loads, whereas a thick blade is stiffer, since the load carrying structure can be further spaced apart, which in turn means that the blade shell can be made thinner. The overall mass may thus be kept down. However, the combination of using a narrow shoulder width and a relative thick blade profile has surprisingly been found to increase the annual energy production (AEP) of such a blade significantly, in particular since the blade can be made longer than existing blades imposing approximately the same loading on the wind turbine provided with such blades. However, if one were to use one of these two measures alone to reduce loading, the AEP would have been decreased.

By shoulder is meant the position at which the wind turbine blade has its largest chord length. The length interval is defined from the root end to the tip end, the root end thus being positioned at r=0 and the tip end being positioned at r=L.

Preferably, the blade is prebent or prestressed. In such an embodiment, the blade is curved towards the pressure side of the blade, i.e. being curved so that the blade during when installed on an upwind wind turbine will curve away from a tower of the wind turbine, at least at relative low wind speeds. In operation at for instance the design wind speed, the blades are straightened due to the force of the incoming wind and the pressure distribution on the pressure side (or correspondingly the upwind or windward side) of the blade and the suction side (or correspondingly the downwind or leeward side) of the blade, respectively, thus maximising the area swept by the blade in a rotor plane. A prebent blade makes it possible to lower the stiffness of the blade even further, thereby reducing the material needed and consequently also the loading of the blade.

All in all, it is seen that a narrow shoulder or slender blade with a relative high thickness and provided with a prebend all are measures which combined provide a blade with lower loading than prior art blades.

In one embodiment, the ratio between the shoulder width and the blade length being less than or equal to 0.073, and advantageously less than or equal to 0.0725 and more advantageously less than or equal to 0.072. These embodiments all provide blades, which are relatively slender, i.e. having a small maximum chord length.

In another embodiment, the relative thickness in a blade length interval of 0-0.8 L is at least 23%, advantageously at least 23.5%, and more advantageously at least 24%. Such profiles has a relative blade thickness which are significantly larger than conventional blades, in particular in the region from 0.65 L-0.8 L.

In yet another advantageous embodiment, the relative blade thickness in the blade interval of 0-0.8 L is at least 25%, or at least 26%.

Advantageously, the blade length is at least 40 meters, more advantageously between 40 meters and 50 meters. The slenderness and thickness proposed has been found to be particularly suited for these blade lengths.

In an advantageous embodiment, the root region has a root diameter at the root end of the blade, wherein the ratio between the shoulder width and the root diameter is 1.6 or less. By having a low shoulder width to root diameter radius it is possible to have a small divergence of the trailing edge and leading edge of the blade in the transition region, which in turn means that the curvature of the trailing edge and the leading edge, respectively, may be kept low. Thus, according to a particularly advantageous embodiment, the trailing edge has a smooth shape without any discontinuities in the longitudinal direction of the blade. This particular applies to the transition region of the blade and including the transitions from the root region to the transition region and from the transition region to the airfoil region of the blade. From a manufacturing point of view, such an embodiment is attractive, since it makes it easier to carry out the fibre layer layup in the moulds for manufacturing. Furthermore, the loadings which affect the trailing edge during normal operation of such a blade will be significantly reduced.

In another advantageous embodiment, the trailing edge has a curvature with an outer radius external to the trailing edge, which at all positions is at least 0.2 L, advantageously at least 0.22 L, and more advantageously at least 0.24 L. According to one embodiment, the position of minimum outer radius is located between 0.04 L and 0.06 L, advantageously between 0.045 L and 0.055 L.

In yet another advantageous embodiment, the trailing edge has a curvature with an inner radius (Ri) internal to the trailing edge, which at all positions is at least 0.2 L, advantageously at least 0.225 L, and more advantageously at least 0.25 L. According to one embodiment, the position of minimum outer radius is located between 0.16 L and 0.20 L, advantageously between 0.19 L and 0.21 L.

A large trailing edge radius (inner and/or outer) ensures a low trailing edge curvature, which from a manufacturing point of view means that the fibre layup may be carried out without the fibre layers wrinkling. This in turn ensures that the finished blade shell after injection of resin and curing does not comprise detrimental mechanical properties.

Due to the twist and the three-dimensional design of the blade, it may be difficult to determine the exact location of the trailing edge. Therefore, the inner and outer radius may in one embodiment be deduced by projecting the blade into a plane, when observing the blade from above at 0 degree pitch.

In one embodiment, the shoulder is located in an interval between 0.18 L and 0.25 L, advantageously between 0.19 L and 0.24 L. In one advantageous embodiment, a wind turbine blade having a length in the interval of 40-45 meters has the shoulder located between 0.19 L and 0.21 L. In another embodiment of wind turbine blade having a length in the interval 45-50 meters, advantageously in the interval 46.5-48.5 meters, the shoulder is located between 0.22 L and 0.24 L.

In another embodiment, the leading edge has a smooth shape without any discontinuities in the longitudinal direction of the blade. Advantageously, the blade comprises a pitch axis, and wherein a distance between the leading edge to the pitch axis from the root end to the shoulder increases no more than 20%, advantageously no more than 15%.

As previously mentioned, the wind turbine blade is preferably prebent or curved towards the pressure side of the blade. The prebend at the tip end of the blade is in one embodiment at least 0.05 L, advantageously at least 0.06 L, more advantageously at least 0.65 L, and even more advantageously at least 0.07 L. By prebent is meant that the profile centre or chord of a local profile is distanced from a pitch axis or longitudinal axis of the blade. By increasing the prebend compared to conventional blades the stiffness must be lower in order for the blade to straighten and maximising the swept area at the design wind speed. Thus, less material is needed in the blade shell or the load bearing structure of the blade. This in turn means that the total mass of the blade may be lowered even more.

Advantageously, the blade is prebent over at least an outer 50% of the blade, advantageously over at least an outer 60% of the blade, even more advantageously over at least an outer 70%, or even at least an outer 75%. Thus, the blade is curved over a large part of the blade at the part nearest the tip.

In another embodiment, the blade is provided with a twist, and wherein the airfoil region comprises an inboard part in which a twist angle is decreasing towards the tip end of the blade and an outboard part in which, the twist angle is increasing towards the tip end of the blade, said outboard part and inboard part being separated by a position of a twist inflection tangent. By decreasing the twist angle in an inboard part of the blade, a compensation for the local radial velocity of the blade is achieved. The tip noise from the blade is reduced by letting the twist of the outboard part of the blade be increasing towards the tip.

The twist is usually calculated from a defined point of origin. For the present blade, said origin may for instance be defined at the inflection tangent, the local twist in this position thus being defined as 0 degrees. Thus, it is clear that the twist is not to be regarded only as a local absolute twist angle, which may vary due to the set pitch angle of the blade, but that it rather should be seen as a twist variation, i.e. as the difference in twist angle between one cross-sectional profile at a first radial position of the blade, and a second cross-sectional profile at a second radial position of the blade for a given pitch setting of the blade.

In yet another embodiment, the position of the twist inflection tangent is located between 0.8 L and 0.9 L, advantageously between 0.82 L and 0.88 L, more advantageously between 0.83 L and 0.87 L, and even more advantageously approximately at 0.85 L.

Advantageously, the twist in the outboard region is at least 4 degrees, advantageously at least 5 degrees, and more advantageously at least 5.5 degrees. Thus, the difference in twist at the point of the inflection tangent and the tip is at least 4, 5, or 5.5 degrees. The twist in the inboard part may advantageously be between 8 and 12 degrees, advantageously between 8.5 and 11.5 degrees, and more advantageously between 9 and 11 degrees. Thus, the difference in twist at the shoulder and the point of the inflection tangent is between 8 and 12 degrees.

In one embodiment, the blade is provided with a twist, which in the root region and the transition region is increasing towards the tip end of the blade. The increase in twist may for instance in the root region and transition region be between 1.5 and 2.5 degrees. Thus, the twist variation in this region is between 1.5 and 2.5 degrees.

According to a second aspect, the invention provides a number of wind turbine blade profiles, which are particularly effective and which depart from standard blade profiles, such as NACA profiles, which are typically utilised for wind turbine blades. The blade profiles are not only applicable to the wind turbine blade according to the first aspect of the invention.

Thus, the invention provides a wind turbine blade, which in a cross-section comprises at least one of the following six profiles:
  a first airfoil profile having a relative thickness of between 35% and 37% and a position of maximum thickness located between 0.24 c and 0.30 c from the leading edge, advantageously located between 0.25 c and 0.29 c and more advantageously around 0.26 c and 0.28 c,
  a second airfoil profile having a relative thickness of between 29% and 31% and a position of maximum thickness located between 0.28 c and 0.32 c from the leading edge, advantageously between 0.29 c and 0.31 c,
  a third airfoil profile having a relative thickness of between 26.3% and 27.7% and a position of maximum thickness located between 0.28 c and 0.32 c from the leading edge, advantageously between 0.29 c and 0.31 c,
  a fourth airfoil profile having a relative thickness of between 23.5% and 24.5%, advantageously between 23.8% and 24.2%, and a position of maximum thickness located between 0.35 c and 0.39 c from the leading edge, advantageously between between 0.36 c and 0.38 c from the leading edge, a fifth airfoil profile having a relative thickness of between 20.6% and 21.4% and a position of maximum thickness located between 0.35 c and 0.39 e from the leading edge, advantageously between 0.36 c and 0.38 c, and a sixth airfoil profile having a relative thickness of between 17.7% and 18.3% and a position of maximum thickness located between 0.37 c and 0.41 c from the leading edge, advantageously between 0.38 c and 0.40 c.

Figure 3:
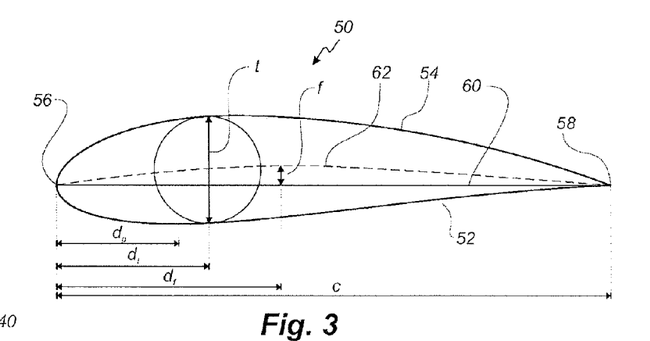
FIG. 3 shows a schematic view of an airfoil profile.

The airfoils are defined in relation to the relative thickness of the profile, the relative chordal position of the maximum thickness, and the relative chordal position of the maximum pressure side camber. The thickness is defined in a direction perpendicular to the chord, and the pressure side camber is defined as the distance between the pressure side of the blade and the chord in a direction perpendicular or normal to the chord. These parameters are also depicted in FIG. 3 and explained in the accompanying description.

Preferably, the blade comprises a root region, a transition region, and an airfoil region in accordance with the wind turbine according to the first aspect of the invention. In such an embodiment, the profiles are located in the airfoil region (outboard of the shoulder) of the blade.

In one embodiment, the blade comprises at least two of the six airfoil profiles. In another embodiment, the blade comprises at least three of the six airfoil profiles. In yet another embodiment, the blade comprises at least four of the six airfoil profiles. The blade may also comprise at least five of the six airfoil profiles, and it may even comprise all six of the airfoil profiles.

The aforementioned embodiments and the following embodiments may all relate to a wind turbine blade according to the first aspect as well as a wind turbine blade according to the second aspect.

The first airfoil profile may comprise a position of maximum pressure side camber located between 0.24 c and 0.30 c from the leading edge, advantageously located between 0.25 c and 0.29 c and more advantageously around 0.26 c and 0.28 c. The first airfoil profile may advantageously be located between 0.23 L and 0.30 L.

The second airfoil profile may comprise a position of maximum pressure side camber located between 0.28 c and 0.32 c from the leading edge, advantageously between 0.29 c and 0.31 c. The second airfoil profile may advantageously be located between 0.30 L and 0.36 L.

The third airfoil profile may comprise a position of maximum pressure side camber located between 0.255 c and 0.295 c from the leading edge, advantageously between 0.265 c and 0.285 c. The third airfoil profile may advantageously be located between 0.36 L and 0.45 L.

The fourth airfoil profile may comprise a position of maximum pressure side camber located between 0.35 c and 0.39 c from the leading edge, advantageously between 0.36 c and 0.38 c. The fourth airfoil profile may be located between 0.5 L and 0.85 L, advantageously along the entire interval from 0.67 L to 0.8 L.

The fifth airfoil profile may comprise a position of maximum pressure side camber located between 0.31 c and 0.35 c from the leading edge, advantageously between 0.32 c and 0.34 c. The fifth airfoil profile may advantageously be located between 0.85 L and 0.95 L.

The sixth airfoil profile may comprise a position of maximum pressure side camber located between 0.37 c and 0.41 c from the leading edge, advantageously between 0.38 c and 0.40 c. The sixth airfoil profile may advantageously be located at the tip, between 0.95 L and L.

Common for the novel airfoil profiles and in particular for the fourth, fifth and sixth airfoil profiles is that they are relatively thick and that the position of maximum thickness is positioned relatively far from the leading edge. Also, it is seen that the position of maximum pressure side camber is nearly coincident with the position of maximum relative thickness. These features have surprisingly been found to a high lift-to-drag ratio at the design point despite of the large relative thicknesses of the profiles. Furthermore, the airfoils are geometrically compatible.

According to one embodiment, a region between adjacent airfoil profiles comprises a smooth transition between said adjacent profiles via interpolation between said adjacent profiles, e.g. via Gaussian distribution curves. Thus, the region between the first airfoil profile and the second airfoil profile comprises interpolated profiles between the first airfoil profile, and correspondingly between the second and the third airfoil profile, between the third and the fourth airfoil profile, between the fourth and the fifth airfoil profile, and/or between the fifth and the sixth airfoil profile. The transitions should of course also account for the varying twist in the longitudinal direction of the blade.

The blade may advantageously be provided with flow altering devices, such as vortex generators, wherein said devices are arranged at profile sections having a relative thickness of at least 30%. In one embodiment, the blade is provided with flow altering devices, such as vortex generators, wherein said devices are arranged at profile sections having a relative thickness of maximum 70%.

In one particularly advantageous embodiment, the flow altering devices are lift augmenting devices.

Thus, the devices are arranged in a longitudinal region where the relative profile thickness is between 30% and 70%. According to another advantageous embodiment, said devices are arranged in a range between 0.1 L and 0.4 L, advantageously between 0.11 L and 0.37 L. The devices may be arranged in this region only.

In one embodiment, the relative thickness of the blade at the shoulder is between 40% and 50%, advantageously between 42% and 48%.

Preferably, the blade comprises a shell body. The shell body may for instance be assembled from a pressure side shell and a suction side shell, which are adhered or bonded to each other near the leading edge and near the trailing edge. In another embodiment, the shell is manufactured via a one-shot process, e.g. via a closed, hollow moulding method.

The shell body may comprise a longitudinally extending load carrying structures, such as a main laminate. Such a load carrying structure or main laminate is typically formed as a fibre insertion which comprises a plurality of fibre reinforcement layers, e.g. between 20 and 50 layers. On each side of the load carrying structure, the blade typically comprises a sandwich structure with a core material, such as balsa wood or foamed polymer, and with an inner and outer skin made of fibre reinforced polymer.

The blade shell is typically made of a fibre reinforced polymer material. The reinforcement fibres may for instance be glass fibres, carbon fibres, aramid fibres, metallic fibres, such as steel fibres, or plant fibres, whereas the polymer for instance may be epoxy, polyester or vinylester.

According to a third aspect, the invention provides a wind turbine comprising a number, preferably two or three, of blades according to any of aforementioned embodiments, the blades extending substantially radially from a hub on a main shaft having a substantially horizontal centre axis, the blades together with the hub constituting a rotor with a rotor plane, and which can be put into rotation by wind.

In one embodiment, the wind turbine is pitch controlled. The wind turbine may be power regulated. According to one embodiment, a maximum power output of the wind turbine is between 1.3 MW and 1.7 MW, advantageously around 1.5 MW. That is, the blades are particularly suited for 1.5 MW class wind turbines.

The invention is explained in detail below with reference to an embodiment shown in the drawings, in which.

Figure 1:
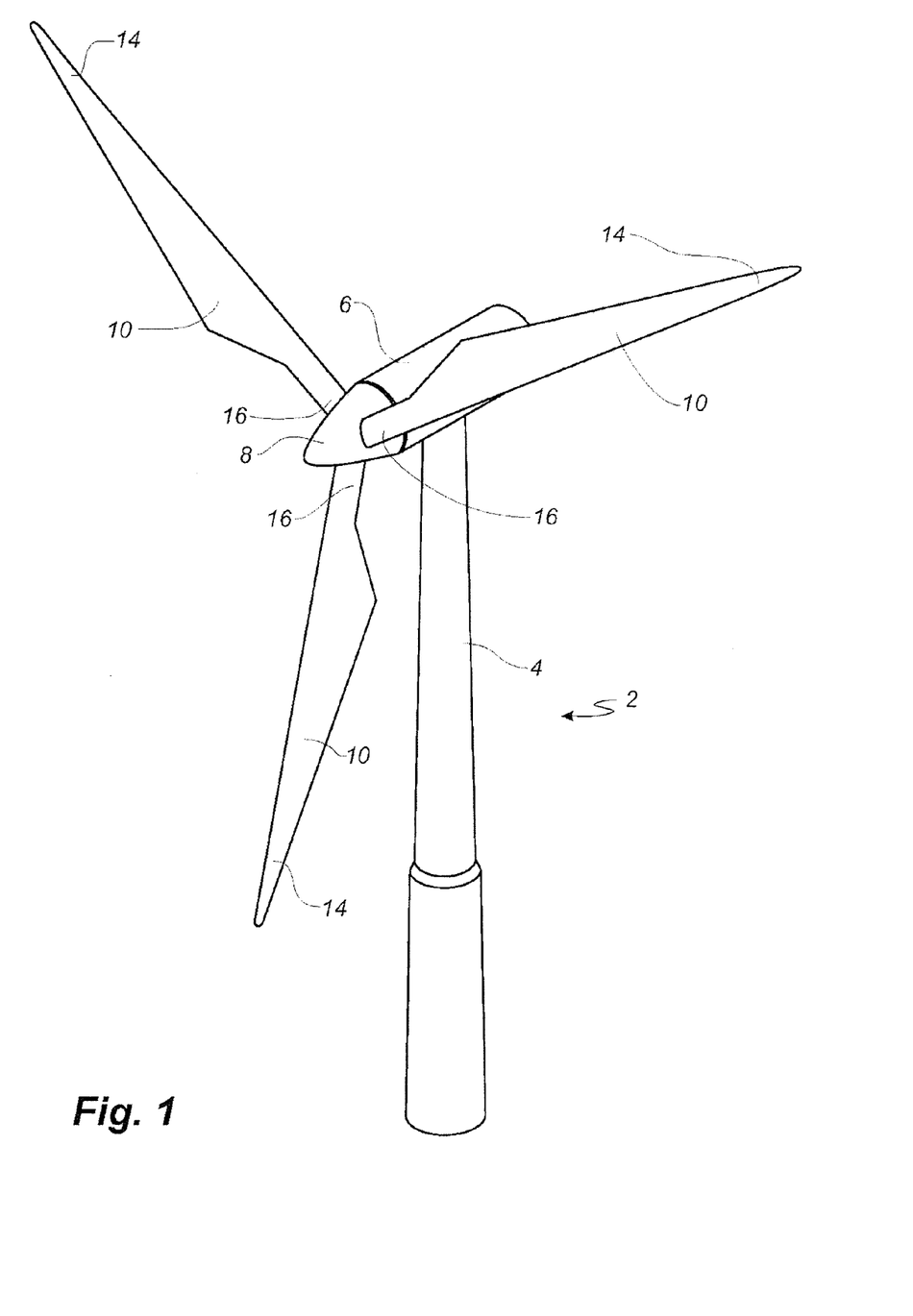
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
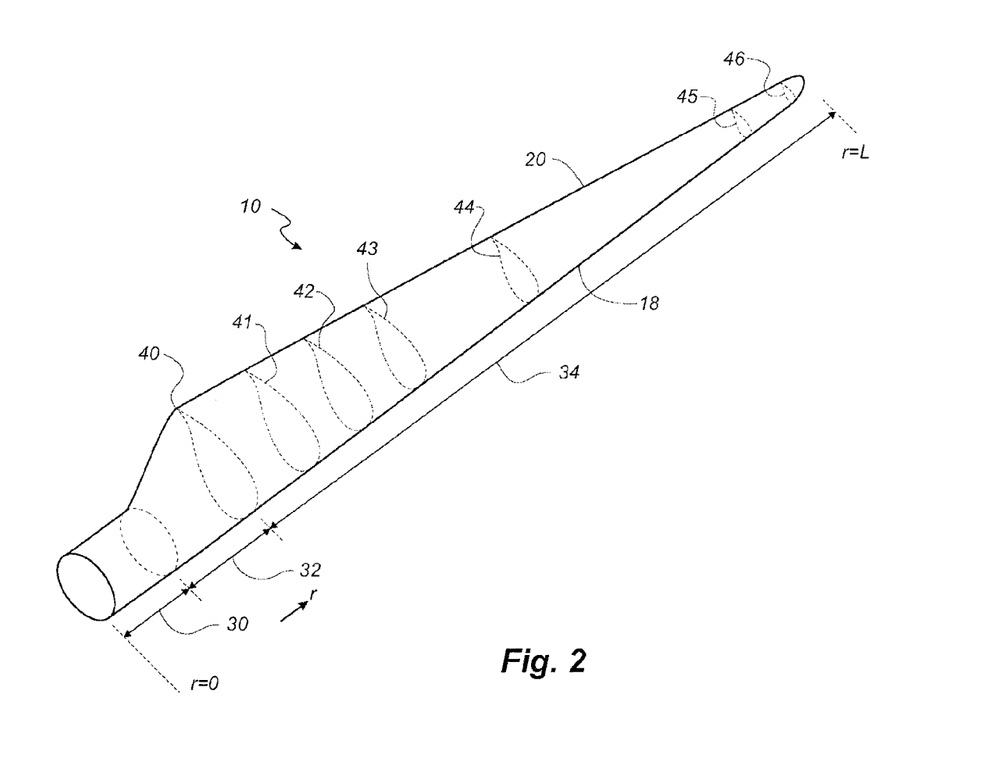
FIG. 2 shows a schematic view of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 4:
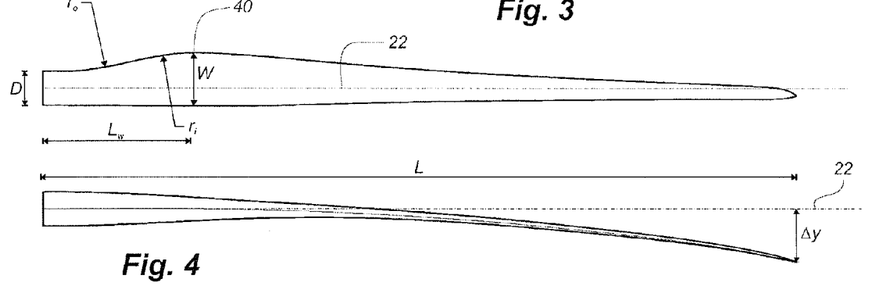
FIG. 4 shows a schematic view of the wind turbine blade according to the invention, seen from above and from the side

FIGS. 3 and 4 depict parameters, which is used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

Example

In the following an example of a wind turbine blade according to the invention is given.

The wind turbine blade is provided with the following parameters for length, shoulder width, minimum curvature radii for trailing edge and root cylinder diameter:

TABLE 1

| Parameter | Size |
| --- | --- |
| L | 42.13 m |
| $L_W$ | 8.5 m |
| W | 2.975 m |
| $r_o$ | 10.3 m |
| $r_i$ | 11.3 m |
| D | 1.893 m |

The distribution of chord length c, relative thickness t/c, and prebend Δy is listed in Table 2:

TABLE 2

| r [m] | c [cm] | t/c [%] | Δy [cm] |
| --- | --- | --- | --- |
| 0 | 189.3 | 100 | 0 |
| 1 | 189.3 | 100 | 0 |
| 2 | 192.5 | 98.2 | 0 |
| 4 | 223.8 | 80.2 | 0 |
| 6 | 267.8 | 60.2 | 0 |
| 8 | 295.8 | 46.6 | 0.1 |
| 10 | 292.7 | 39.2 | 1.6 |
| 12 | 277.3 | 34.4 | 5.2 |
| 14 | 256.9 | 30.8 | 10.5 |
| 16 | 233.7 | 28.1 | 17.8 |
| 18 | 210.7 | 26.2 | 26.8 |
| 20 | 190.6 | 25.0 | 37.6 |
| 22 | 173.1 | 24.3 | 50.2 |
| 24 | 157.8 | 24.1 | 64.5 |
| 26 | 144.3 | 24.1 | 80.6 |
| 28 | 132.0 | 24.0 | 98.5 |
| 30 | 120.6 | 24.0 | 118.0 |
| 32 | 109.7 | 24.0 | 139.3 |
| 34 | 99.1 | 24.0 | 162.2 |
| 36 | 89.3 | 23.4 | 187.3 |
| 38.355 | 79.3 | 21.7 | 222.3 |
| 40.861 | 63.4 | 18.8 | 270.1 |
| 42.13 | 4.0 | 18.0 | 300.0 |

The wind turbine blade comprises six novel blade profiles 41-46, which are located at different longitudinal positions along the blade and as shown in FIG. 2. Table 3 lists the relative thickness t/c, the position of maximum thickness $d_t/c$, the position of the maximum pressure side camber $d_p/c$ and the approximate radial position r of the profiles:

TABLE 3

| Airfoil | Ref. Numeral | t/c | $d_t/c$ | $d_p/c$ | r |
| --- | --- | --- | --- | --- | --- |
| First | 41 | 36% | 27.1% | 26.6% | 11.0 m |
| Second | 42 | 30% | 29.6% | 29.7% | 14.5 m |
| Third | 43 | 27% | 29.8% | 27.2% | 17.0 m |
| Fourth | 44 | 24% | 37.1% | 36.8% | 26.0 m–34.0 m |
| Fifth | 45 | 21% | 37.0% | 33.0% | 39.0 m |
| Sixth | 46 | 18% | 39.2% | 39.4% | 41.8 m–42.13 m |

The airfoil profiles have surprisingly been found to provide higher lift-to-drag ratios than conventional wind turbine airfoils and in particular compared to NACA-profiles. The six profiles are aerodynamic compatible, and the regions between adjacent airfoil profiles comprise a smooth transition between said adjacent profiles via interpolation between said adjacent profiles, e.g. via Gaussian distribution curves. The transitions also account for the varying twist in the longitudinal direction of the blade and the transition is thus seen to be three-dimensional.

FIGS. 5-8 depict graphs of the chordal distribution c, the relative thickness t/c, the twist θ, and the prebend Δy of the wind turbine blade according to the example (denoted LM42.1p) as a function of the relative radial position r/L. The graphs are compared to that of the prior art blade LM40.3p, which has a blade length of 40.0 m and thus is comparable to the present blade.

Figure 5:
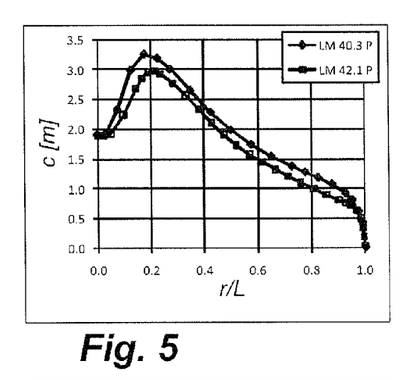
FIG. 5 shows a chord length distribution of the wind turbine blade according to the invention.

From FIG. 5, it can be seen that the shoulder width of the present blade is approximately 8% smaller than that of the prior art blade. Further, it should be noted that the x-axis depict the relative radial position of the blade. Thus, the relative shoulder width of the present blade has been reduced even further than the 8%.

Figure 6:
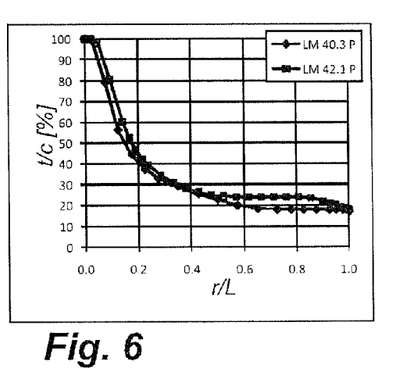
FIG. 6 shows chord a relative thickness distribution of the wind turbine blade according to the invention.

FIG. 6 depicts a graph of the relative blade thickness as a function of the relative radial blade position. It is seen that the relative thickness of the present blade is much higher than the relative thickness of the prior art blade, in particular in the range from 0.5 L to 0.9 L. In the range from 0.6 L to 0.8 L the relative thickness is approximately 33% larger than the prior art blade.

Figure 7:
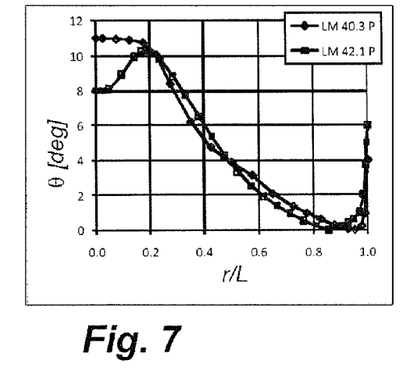
FIG. 7 shows a twist distribution of the wind turbine blade according to the invention.

FIG. 7 shows the twist distribution of the present blade compared to the prior art blade. It can be seen that the twist is increasing in the root region and the transition region as opposed to the prior art blade, where the twist is substantially constant or slightly decreasing in this region. The twist is decreasing in an inboard part of the airfoil region and is increasing in an outboard part of the airfoil region. The inboard part and the outboard part are separated by a position of a twist inflection tangent. The twist at the inflection tangent is defined as 0 degrees twist. The inflection tangent is located at r=0.855 L, which is much further inboard than the prior art blade, where the inflection tangent is located at r=0.943 L. The maximum twist of the present blade is 10.28 degrees, which is smaller than the maximum twist of 11 degrees of the prior art blade.

Figure 8:
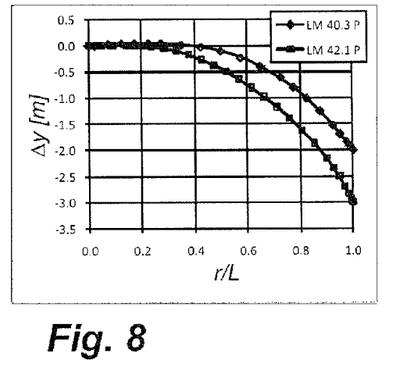
FIG. 8 shows chord a prebend distribution of the wind turbine blade according to the invention.

FIG. 8 depicts the prebend of the blade, and it can be seen that the total absolute prebend of the present blade is 50% larger than that of the prior art blade.

All these differences, and in particular a narrower shoulder, a relative thicker blade and a larger prebend combined makes it possible to obtain a lighter blade, which mechanically is just as strong, but performs aerodynamic more efficient. In fact, the present blade has a lower mass than the prior art blade despite being longer. The loadings that the two blades would impose on a wind turbine are comparable, which means that the present blade readily may replace the prior art blade without having to re-dimensioning the wind turbine itself.

Figure 9:
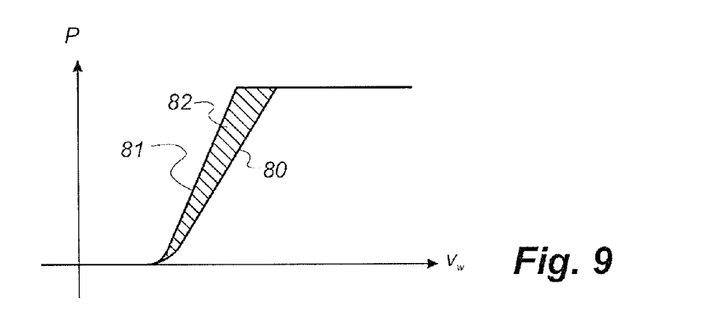
FIG. 9 shows a power curve of a wind turbine according to the invention as a function of wind speed.

FIG. 9 schematically illustrates a first power curve 80 showing the power output of a wind turbine provided with prior art blades and a second power curve 81 showing the power output of a wind turbine provided with blades according to the present invention, both graphs illustrated as a function of wind speed $v_w$. It is seen that the power output increases more quickly as a function of the wind speed until the level of power regulation of the wind turbine. The increase in annual energy production (AEP) relates to the difference between the two curves and thus the hatched area 82 of the graph. The increase in AEP is projected to be 4%.

LIST OF REFERENCE NUMERALS 2 wind turbine
4 tower
6 nacelle
8 hub
10 blade 14 blade tip
16 blade root
18 leading edge
20 trailing edge
22 pitch axis
30 root region
32 transition region
34 airfoil region
41 first airfoil profile
42 second airfoil profile
43 third airfoil profile
44 fourth airfoil profile
45 fifth airfoil profile
46 sixth airfoil profile
50 airfoil profile
52 pressure side
54 suction side
56 leading edge
58 trailing edge
60 chord
62 camber line/median line
80 power curve of wind turbine with prior art blades
81 power curve of wind turbine with novel blades
82 increase in power output
c chord length
$d_t$ position of maximum thickness
$d_f$ position of maximum camber
$d_p$ position of maximum pressure side camber
f camber
L blade length
P power output
r local radius, radial distance from blade root
t thickness
$v_w$ wind speed
θ twist, pitch
Δy prebend

The invention claimed is:

1. A blade (10) for a rotor of a wind turbine (2) having a substantially horizontal rotor shaft, said rotor comprising a hub (8), from which the blade (10) extends substantially in a radial direction when mounted to the hub (8), the blade having a longitudinal direction (r) with a tip end (16) and a root end (14) and a transverse direction, the blade further comprising:
a profiled contour including a pressure side and a suction side, as well as a leading edge (18) and a trailing edge (20) with a chord having a chord length (c) extending there between, the profiled contour, when being impacted by an incident airflow, generating a lift, wherein the profiled contour is divided into:
a root region (30) having a substantially circular or elliptical profile closest to the hub,
an airfoil region (34) having a lift-generating profile furthest away from the hub, and
a transition region (32) between the root region (30) and the airfoil region (34), the transition region (32) having a profile gradually changing in the radial direction from the circular or elliptical profile of the root region to the lift-generating profile of the airfoil region, and with
a shoulder (40) having a shoulder width (W) and located at the boundary between the transition region (32) and the airfoil region (34), wherein
the blade (10) has a blade length (L), and
the profiled contour comprises a local relative thickness defined as the local ratio between a maximum profile thickness (t) and the chord length (c), wherein
the ratio between the shoulder width (W) and the blade length (L) being less than or equal to 0.075, and
the relative thickness (t/c) in a blade length interval of 0-0.8 L is at least 22%.

2. The wind turbine blade according to claim 1, wherein the ratio between the shoulder width (W) and the blade length (L) being less than or equal to 0.073.

3. The wind turbine blade according to claim 1, wherein the relative thickness (t/c) in a blade length interval of 0-0.8 L is at least 23%.

4. The wind turbine blade according to claim 1, wherein the blade length (L) is at least 40 meters.

5. The wind turbine blade according to claim 1, wherein the root region has a root diameter (D) at the root end of the blade, wherein the ratio between the shoulder width (W) and the root diameter is 1.6 or less.

6. The wind turbine blade according to claim 1, wherein the trailing edge has a smooth shape without any discontinuities in the longitudinal direction of the blade.

7. The wind turbine blade according to claim 6, wherein the trailing edge has a curvature with an outer radius ($r_o$) external to the trailing edge, which at all positions is at least 0.2 L.

8. The wind turbine blade according to claim 6, wherein the trailing edge has a curvature with an inner radius ($r_i$) internal to the trailing edge, which at all positions is at least 0.2 L.

9. The wind turbine blade according to claim 1, wherein the shoulder is located in an interval between 0.18 L and 0.25 L.

10. The wind turbine blade according to claim 1, wherein the leading edge has a smooth shape without any discontinuities in the longitudinal direction of the blade.

11. The wind turbine blade according to claim 1, wherein the blade comprises a pitch axis, and wherein a distance between the leading edge to the pitch axis from the root end to the shoulder increases no more than 20%.

12. The wind turbine blade according to claim 1, wherein the wind turbine blade is prebent towards the pressure side of the blade, and a prebend (Δy) at the tip end of the blade is at least 0.05 L.

13. The wind turbine blade according to claim 12, wherein the blade is prebent over at least an outer 50% of the blade.

14. The wind turbine blade according to claim 1, wherein the blade is provided with a twist, and wherein the airfoil region comprises an inboard part in which a twist angle is decreasing towards the tip end of the blade and an outboard part in which the twist angle is increasing towards the tip end of the blade, said outboard part and inboard part being separated by a position of a twist inflection tangent.

15. The wind turbine blade according to claim 14, wherein the position of the twist inflection tangent is located between 0.8 L and 0.9 L.

16. The wind turbine blade according to claim 14, wherein the twist in the outboard region varies at least 4 degrees.

17. The wind turbine blade according to claim 14, wherein the twist in the inboard part varies between 8 and 12 degrees.

18. The wind turbine blade according to claim 1, wherein the blade is provided with a twist, which in the root region and the transition region is increasing towards the tip end.

19. The wind turbine blade according to claim 18, wherein the increase in twist is the root region and transition region is between 1.5 and 2.5 degrees.

20. The wind turbine blade according to claim 18, wherein the blade comprises a first airfoil profile having a relative thickness of between 35% and 37% and a position of maximum thickness located between 0.24 c and 0.30 c from the leading edge.

21. The wind turbine blade according to claim 20, wherein the first airfoil profile comprises a position of maximum pressure side camber located between 0.24 c and 0.30 c from the leading edge.

22. The wind turbine blade according to claim 20, wherein the first airfoil profile is located between 0.23 L and 0.30 L.

23. The wind turbine blade according to claim 18, wherein the blade comprises a second airfoil profile having a relative thickness of between 29% and 31% and a position of maximum thickness located between 0.28 c and 0.32 c from the leading edge.

24. The wind turbine blade according to claim 23, wherein the second airfoil profile comprises a position of maximum pressure side camber located between 0.28 c and 0.32 c from the leading edge.

25. The wind turbine blade according to claim 23, wherein the second airfoil profile is located between 0.30 L and 0.36 L.

26. The wind turbine blade according to claim 18, wherein the blade comprises a third airfoil profile having a relative thickness of between 26.3% and 27.7% and a position of maximum thickness located between 0.28 c and 0.32 c from the leading edge.

27. The wind turbine blade according to claim 26, wherein the third airfoil profile comprises a position of maximum pressure side camber located between 0.255 c and 0.295 c from the leading edge.

28. The wind turbine blade according to claim 26, wherein the third airfoil profile is located between 0.36 L and 0.45 L.

29. The wind turbine blade according to claim 18, wherein the blade comprises a fourth airfoil profile having a relative thickness of between 23.5% and 24.5% and a position of maximum thickness located between 0.35 c and 0.39 c from the leading edge.

30. The wind turbine blade according to claim 29, wherein the fourth airfoil profile comprises a position of maximum pressure side camber located between 0.35 c and 0.39 c from the leading edge.

31. The wind turbine blade according to claim 29, wherein the fourth airfoil profile is located between 0.5 L and 0.85 L.

32. The wind turbine blade according to claim 18, wherein the blade comprises a fifth airfoil profile having a relative thickness of between 20.6% and 21.4% and a position of maximum thickness located between 0.35 c and 0.39 c from the leading edge.

33. The wind turbine blade according to claim 32, wherein the fifth airfoil profile comprises a position of maximum pressure side camber located between 0.31 c and 0.35 c from the leading edge.

34. The wind turbine blade according to claim 32, wherein the fifth airfoil profile is located between 0.85 L and 0.95 L.

35. The wind turbine blade according to claim 18, wherein the blade comprises a sixth airfoil profile having a relative thickness of between 17.7% and 18.3% and a position of maximum thickness located between 0.37 c and 0.41 c from the leading edge.

36. The wind turbine blade according to claim 35, wherein the sixth airfoil profile comprises a position of maximum pressure side camber located between 0.37 c and 0.41 c from the leading edge.

37. The wind turbine blade according to claim 35, wherein the sixth airfoil profile is located at the tip, between 0.95 L and L.

38. The wind turbine blade according to claim 20, wherein a region between adjacent airfoil profiles comprises a smooth transition between said adjacent profiles via interpolation between said adjacent profiles.

39. The wind turbine blade according to claim 18, wherein the blade is provided with flow altering devices, wherein said devices are arranged at profile sections having a relative thickness of at least 30%.

40. The wind turbine blade according to claim 18, wherein the blade is provided with flow altering devices, wherein said devices are arranged at profile sections having a relative thickness of maximum 70%.

41. The blade according to claim 18, wherein the relative thickness of the blade at the shoulder is between 40% and 50%.

42. The blade according to claim 18, wherein the blade comprises a shell body.

43. The blade according to claim 42, wherein the shell body comprises longitudinally extending load carrying structures.

44. The wind turbine comprising a number of blades according to claim 42, the blades extending substantially radially from a hub on a main shaft having a substantially horizontal centre axis, the blades together with the hub constituting a rotor with a rotor plane, and which can be put into rotation by wind.

45. The wind turbine according to claim 44, wherein the wind turbine is pitch controlled.

46. The wind turbine according to claim 44, wherein the wind turbine is power regulated.

47. The wind turbine according to claim 44, wherein a maximum power output of the wind turbine is between 1.3 MW and 1.7 MW.

* * * * *